United States Patent
Gupta et al.

(10) Patent No.: US 11,478,768 B2
(45) Date of Patent: Oct. 25, 2022

(54) REACTOR JACKET DESIGN

(71) Applicant: Chevron Phillips Chemical Company LP, The Woodlands, TX (US)

(72) Inventors: Anurag Gupta, Sugarland, TX (US); Scott E. Kufeld, Houston, TX (US); Larry W. Ezell, Bryan, TX (US); Robert R. McElvain, Kingwood, TX (US); Robert F. Parrott, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 712 days.

(21) Appl. No.: 16/402,678

(22) Filed: May 3, 2019

(65) Prior Publication Data

US 2020/0346179 A1 Nov. 5, 2020

(51) Int. Cl.
*B01J 8/06* (2006.01)
*B01J 19/24* (2006.01)
*B01J 8/04* (2006.01)
*C08F 10/00* (2006.01)

(52) U.S. Cl.
CPC .......... *B01J 8/067* (2013.01); *B01J 8/0492* (2013.01); *B01J 8/0496* (2013.01); *B01J 8/065* (2013.01); *B01J 19/2465* (2013.01); *C08F 10/00* (2013.01); *B01J 2208/00212* (2013.01); *B01J 2208/065* (2013.01)

(58) Field of Classification Search
USPC ................................................. 422/138, 205
See application file for complete search history.

(56) References Cited

U.S. PATENT DOCUMENTS

| | | |
|---|---|---|
| 3,229,754 A | 1/1966 | Hoag |
| 4,449,016 A | 5/1984 | Best |
| 4,674,290 A | 6/1987 | Verser |
| 5,183,866 A | 2/1993 | Hottovy |
| 5,455,314 A | 10/1995 | Burns et al. |
| 5,565,175 A | 10/1996 | Hottovy et al. |
| 6,045,661 A | 4/2000 | Kreischer et al. |

(Continued)

FOREIGN PATENT DOCUMENTS

WO 2009101008 A1 8/2009

OTHER PUBLICATIONS

Khunedi V. Gololo, et al., "Complex Cooling Water Systems Optimization With Pressure Drop Consideration," I&EC Research, American Chemical Society, ACS Publications, Ind. Eng. Chem. Res. 2013, 52, pp. 7056-7065.

*Primary Examiner* — Fred M Teskin
(74) *Attorney, Agent, or Firm* — Eversheds Sutherland (US) LLP

(57) ABSTRACT

Reactor systems, reactor coolant systems, and associated processes for polymerizing polyolefins are described. The reactor systems generally include a reactor pipe and a coolant system, in which the coolant system includes a jacket pipe surrounding at least a portion of the reactor pipe to form an annulus therebetween, at least one spacer coupling the jacket to the reactor pipe, and a coolant which flows through the annulus to remove heat from the reactor pipe. At least one of the external surface of the reactor pipe, the internal surface of the jacket, and at least one spacer, are independently modified, for example by polishing, coating, or reshaping, to reduce the fluid resistance of the coolant flow through the annulus.

24 Claims, 7 Drawing Sheets

(56) References Cited

U.S. PATENT DOCUMENTS

| | | | |
|---|---|---|---|
| 6,051,631 A | 4/2000 | Hottovy | |
| 6,114,501 A | 9/2000 | Hottovy et al. | |
| 6,262,191 B1 | 7/2001 | Hottovy et al. | |
| 7,473,743 B2 | 1/2009 | Fouarge et al. | |
| 7,473,744 B2 | 1/2009 | Chenoweth et al. | |
| 7,780,926 B2 * | 8/2010 | Boe | B01J 8/067 422/205 |
| 8,406,928 B2 | 3/2013 | Gupta et al. | |
| 2003/0044331 A1 * | 3/2003 | DeBellis | B01J 19/244 422/198 |
| 2005/0222346 A1 * | 10/2005 | Kommareddi | B01J 19/249 526/65 |
| 2013/0276426 A1 | 10/2013 | Mungas et al. | |
| 2017/0335028 A1 * | 11/2017 | Littmann | C08F 2/01 |

* cited by examiner

REACTOR JACKET DESIGN

FIELD OF THE DISCLOSURE

This disclosure relates to the coolant system design for a reactor jacket in an olefin polymerization system and related methods.

BACKGROUND

Specific types of polyolefins, such as high-density polyethylene (HDPE), have a number of use-specific applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (i PP), and syndiotactic polypropylene (sPP) are also suitable for similar, and a variety of other, applications. The mechanical requirements of the specific application, such as tensile strength and density, and/or the chemical requirements, such as thermal stability, molecular weight, and chemical reactivity, typically determine what type of polyolefin is most suitable.

To satisfy the demand for such a wide range of polyolefins, various processes have been developed by which olefin monomers such as ethylene, propylene, butene, pentene, hexene (1-hexene), octene, decene, and others may be polymerized to form polyolefin. Olefin polymerization may occur in a liquid-phase polymerization reactor and/or gas-phase polymerization reactor to form the polymer (polyolefin) solid particulates as "fluff" or pellets. The reaction conditions such as temperature, pressure, chemical concentrations, polymer production rate, and so forth, may be selected to achieve the desired melt, physical, rheological, and/or mechanical properties such as density, melt index (MI), melt flow rate (MFR), copolymer content, comonomer content, modulus, and crystallinity, which are desired for the specific application of the polyolefin.

Therefore, there is an ongoing need for new methods and systems that can provide improved performance in the polymerization process, for example, in catalyst activity, monomer yield, energy efficiency, diluent recovery, increased throughput, and so forth. Those improvements which may enhance production while generating cost savings. For example, capital and energy costs are both impacted by the efficiency of the coolant system used to remove the heat of reaction from the reactors used in the polymerization process, and there remains a need for more efficient and effective methods and systems for removing heat from the polyolefin process.

SUMMARY OF THE DISCLOSURE

In an aspect, this disclosure provides reactor systems, reactor coolant systems, and associated processes for polymerizing polyolefins. In an aspect, the reactor systems generally include a reactor pipe such as a loop reactor pipe, which is jacketed in one or more locations by an outer coolant system jacket pipe, which is spaced apart from the reactor pipe. In this configuration, the combination of the reactor pipe and jacket pipe forms an annulus between an internal surface coolant system jacket pipe and an external surface of the loop reactor pipe. The coolant system includes at least one, typically a plurality of spacers which couple and secure the jacket pipe to the reactor pipe. Coolant fluid flows through the annulus to remove heat from the reactor pipe.

In this coolant system arrangement, the coolant fluid contacts and flows across not only the internal surface of the jacket pipe and the external surface of the reactor pipe, but also across and around the spacers within the annulus of the cooling system. This contact of the coolant with these surfaces produces a resistance to fluid flow, decreases cooling system efficiency, and can increase costs associated with cooling and overall process costs.

Therefore, aspects of the present disclosure include one of more methods and processes for improving the efficiency of such as cooling system, including but not limited to: [1] reducing the resistance to coolant fluid flow by reducing the roughness of the internal surface of the jacket pipe, the external surface of the reactor pipe, the spacers within the annulus, or a combination thereof, for example, by polishing or applying a friction-reducing coating; [2] shaping the spacers, particularly shaping the cross-section of the spacers, for improved hydrodynamic performance and coolant fluid flow; [3] providing protrusions or protuberances extending from the external surface of the reactor pipe and/or the internal surface of the jacket pipe into a portion of the annular space, including where the protrusions are matched with a corresponding protrusion on the opposite side of the annulus, to create a venturi effect from the coolant flow; or [4] any combination thereof. In an aspect, the protrusions and the spacers may be shaped in order to impart a curved or partially curved leading edge, and a tapered or partially tapered trailing edge, with respect to fluid flow. The features and methods of this disclosure are applicable to vertical loop reactors and to horizontal loop reactors.

Therefore, in accordance with an aspect, this disclosure provides a reactor system comprising a reactor pipe having an external surface characterized by an unmodified surface roughness; and a coolant system, wherein the coolant system comprises a jacket having an internal surface characterized by an unmodified surface roughness, the jacket spaced apart from and surrounding at least a portion of the reactor pipe to form an annulus between the internal surface of the jacket and the external surface of the reactor pipe, a coolant which flows through the annulus to remove heat from the reactor pipe, and at least one spacer having a leading edge and a trailing edge with respect to the coolant flow and characterized by an unmodified surface roughness, the spacer coupling the jacket to the reactor pipe; wherein the external surface of the reactor pipe, the internal surface of the jacket, the at least one spacer, or any combination thereof are independently modified to reduce the fluid resistance of the coolant flow through the annulus.

Therefore, in accordance with this aspect, by reducing the fluid resistance of the coolant flow through the annulus, the reactor system and process disclosed herein also can provide improvements in pressure drop across the system, leading to less energy being required to pump the coolant, and improvements in cooling efficiency.

In an aspect, the at least one spacer couples the internal surface of the jacket to the external surface of the loop reactor and generally can comprise a material selected from ceramic, stainless steel, or a combination thereof. In another aspect, the spacer or a portion thereof can be treated by polishing or by coating the spacer to provide a more smooth, less rough surface which aids fluid flow.

In a further aspect of the present disclosure, there is provided a reactor system comprising a loop reactor, the loop reactor comprising a reactor pipe having an external surface and a volume of greater than about 35,000 gallons and further comprising a series of reactor pipe sections which form a series of legs which form a loop; and, a coolant system comprising a jacket having an internal surface, spaced apart from and surrounding at least a portion of the reactor pipe to form an annulus between the internal surface of the jacket and the external surface of the reactor pipe, a coolant which flows through the annulus to remove heat from the reactor pipe, and a plurality of spacers, each having a leading edge and a trailing edge with respect to the coolant flow and characterized by an unmodified surface roughness, each spacer coupling the jacket to the reactor pipe; wherein the plurality of spacers are modified by shaping each spacer in cross section to provide a curved or partially curved leading edge, and a tapered or partially tapered trailing edge, and the total coolant pressure drop through the coolant system is less than 15 psi.

There is also provided in this disclosure a method of polymerizing olefins, the method comprising contacting at least one olefin monomer with catalyst within the reactor system comprising the disclosed coolant system under polymerization conditions sufficient to form a polyolefin. The methods and features of this disclosure are applicable to, but not limited to, loop reactors, including horizontal loop reactors and vertical loop reactors. In an aspect, a loop reactor according to this disclosure can operate in liquid or supercritical phases, that is, the reactor pressure can be greater than or less than the critical pressure.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein. The drawings in this disclosure are not necessarily drawn to scale.

FIG. 8 illustrates the cross-sectional areas of two exemplary spacers according to other embodiments of the present disclosure, taken perpendicular to the length of the spacer between the loop reactor pipe and the coolant system jacket pipe, and viewed perpendicular to the direction of flow.

Figure 1:
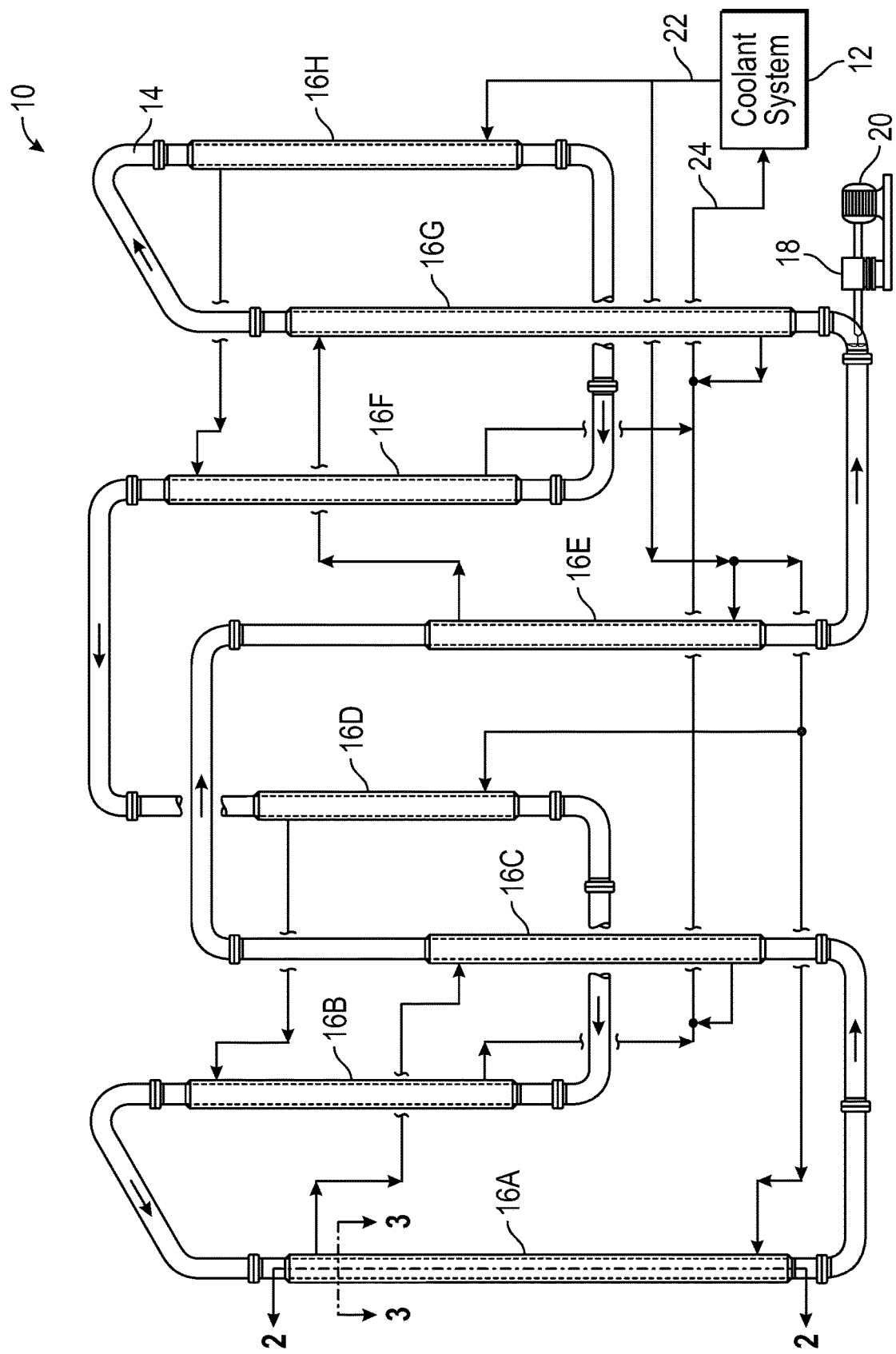
FIG. 1 illustrates a schematic of one embodiment of a polymerization reactor system in accordance with the present disclosure, namely a loop reactor system comprising a series of reactor pipe sections which form a series of legs and which form a loop, which can be used with the cooling system disclosed herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different form. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

In the description below, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. As used herein, the term "about" is meant to account for variations due to experimental error. All numerical measurements are understood to be modified by the word "about", whether or not "about" is explicitly recited, unless specifically stated otherwise. Thus, for example, the statement "a tensile strength of 70,000 psi" is understood to mean "a tensile strength of about 70,000 psi." In another aspect, "about" can mean within ±15% of the stated value, within ±10% of the stated value, within ±5% of the stated value, within ±2% of the stated value, or within ±1% of the stated value.

In the specification and appended claims, the terms "connect", "connection", "connected", "coupled" and "coupling" are used to mean "in direct connection with" or "in connection with via another element."

When describing the fabrication, formation or modification of an object such as a spacer into a specific shape, the terms "shaped", "reshaped", "modified", "modeled" or "remodeled" may be used interchangeably, regardless of whether the object was originally fabricated in that shape or whether an object of a different shape was modified to take on the described or disclosed shape.

The method and system as described are used to remove the heat of reaction from a polyolefin production process. The coolant system as described reduces surface friction and/or form friction between the heat exchange equipment and the coolant and surprisingly generate a significant improvement in the pressure drop across the coolant system. The improvement in pressure drop across the system saves both energy costs, as well as capital costs, since smaller pumps may be effective to move the coolant through the coolant system. By way of example, reduction of the pressure drop across the coolant system, i.e., the combined pressure drop for all heat exchange equipment in the cooling system, from 15 psi to 11 psi can, depending upon the system, provide savings on the order of $100K to $1 M per year.

Various aspects of this disclosure include one of more methods and processes for improving the efficiency of such as cooling system, including but not limited to, the following: [1] reducing the resistance to coolant fluid flow by reducing the roughness of the internal surface of the jacket pipe, the external surface of the reactor pipe, the spacers within the annulus, or a combination thereof, for example, by polishing or applying a friction-reducing coating; [2] shaping the spacers, particularly shaping the cross-section of the spacers, for improved hydrodynamic performance and coolant fluid flow; [3] providing protrusions or protuberances extending from the external surface of the reactor pipe and/or the internal surface of the jacket pipe into a portion of the annular space, including where the protrusions are matched with a corresponding protrusion on the opposite side of the annulus, particularly with a curved or partially curved leading edge, and a tapered or partially tapered trailing edge, to create a venturi effect from the coolant flow; or [4] any combination thereof.

Therefore, in accordance with an aspect, this disclosure provides a reactor system comprising:
- a reactor pipe having an external surface characterized by an unmodified surface roughness; and
- a coolant system, the coolant system comprising
  - a jacket (that is, a jacket pipe) having an internal surface characterized by an unmodified surface roughness, the jacket spaced apart from and surrounding at least a portion of the reactor pipe to form an annulus between the internal surface of the jacket and the external surface of the reactor pipe,
  - a coolant which flows through the annulus to remove heat from the reactor pipe, and
  - at least one spacer having a leading edge and a trailing edge with respect to the coolant flow and characterized by an unmodified surface roughness, the spacer coupling the jacket to the reactor pipe;
- wherein the external surface of the reactor pipe, the internal surface of the jacket, the at least one spacer, or any combination thereof are independently modified to reduce the fluid resistance of the coolant flow through the annulus.

Therefore, according to an aspect, [1] the surface of the at least one spacer may be polished to smooth the surface, [2] the spacer may be shaped, that is modified from a square, rectangular, round cross or other conventional cross-sectional shapes, to provide a cross section that is more efficient hydrodynamically, or [3] a combination thereof. The person of ordinary skill will understand that shaping or "remodeling" can be accomplished in any number of ways. For example, shaping can smooth or round the sharp edges of a square or rectangular cross section to the desired degree.

In an exemplary aspect, such a reactor system is seen in FIG. 1, which provides an illustration of a loop reactor system for olefin polymerization. A significant portion of commercial polyolefins are currently produced in slurry loop reactors, and FIG. 1 illustrates a simplified process flow diagram of an exemplary, non-limiting embodiment of a reactor system 10 suitable for use in association with the present disclosure. The reactor system 10 includes a loop reactor 14 composed of segments of loop reactor pipe connected by smooth bends or elbows. The reactor 14 may be used to carry out polyolefin polymerization under slurry conditions in which insoluble particles of polyolefin are formed in a fluid medium and are suspended as slurry until removed.

In embodiments, the loop reactor system as described can have a volume of at least about 35,000 gallons and/or a reactor production capacity of at least about 125,000 lbs/hr, and a total coolant pressure drop through the reactor system of less than about 15 psi or less than about 11 psi, or a coolant pressure drop per leg of the loop reactor of less than about 1.4 psi. In an aspect the reactor system can have a production capacity of at least about 125,000 lbs/hr and a total coolant pressure drop through the reactor system of less than about 15 psi. Alternatively, the reactor system can have a production capacity of at least about 125,000 lbs/hr and a total coolant pressure drop through the reactor system of less than about 11 psi. The reactor system can also have a production capacity of at least about 125,000 lbs/hr and a coolant pressure drop per leg of the loop reactor of less than about 1.4 psi. In embodiments, the loop reactor system can have a volume of at least about 35,000 gallons and/or a reactor production capacity of at least about 125,000 lbs/hr, and In a further aspect, the reactor system can have a reactor capacity of at least about 35,000 gallons and a total coolant pressure drop through the reactor system of less than about 15 psi. Alternatively, the reactor system can have a reactor capacity of at least about 35,000 gallons and a total coolant pressure drop through the reactor system of less than about 11 psi. The reactor system can also have a reactor capacity of at least about 35,000 gallons and a coolant pressure drop per leg of the loop reactor of less than about 1.4 psi.

The liquid phase reactor, such as a loop slurry reactor system 10, may be constructed of a material (e.g., high-strength aluminum) having higher strength and/or thermal conductivity than the steel materials traditionally utilized in fabrication of the loop slurry reactor. Such newer high-strength materials may provide for improved thinner reactor walls, increased heat-transfer through the walls, and a larger diameter of the loop reactor, permitting a higher polyolefin production rate. Yet another example in the reactor system is the use of guide vanes in the reactor circulation pump system, providing for increased pumping efficiency (reduced electrical consumption) and increased polyolefin production rate. A further example is a technique that specifies a greater increase in the temperature of the coolant flowing through the reactor jackets, for example, from the conventional 10° F. (−12° C.) to the present range of from about 15° F. to about 45° F. (from about −9° C. to about 7° C.) and even higher. Such increased temperature difference between the coolant supply and return imparts substantially the same heat removal capability but at lower flow rates of coolant.

A motive device, such as a pump 18, circulates the fluid slurry in the reactor 14. An example of a pump 18 is an in-line axial flow pump with the pump impeller disposed within the interior of the reactor 14 to create a turbulent mixing zone within the fluid medium. The impeller may also assist in propelling the fluid medium through the closed loop of the reactor, as depicted by arrows, at sufficient speed to keep solid particulates, such as the catalyst or polyolefin product, suspended within the fluid medium. The impeller may be driven by a motor 20 or other motive force. Solid polyolefin particulates may be removed from the reactor 14 via one or more settling legs (not shown) and/or other means, such as one or more continuous take-off (CTO) discharge means. In downstream processing, the polyethylene discharged from the reactor may be extracted from the slurry and purified.

Due to the exothermic nature of the polymerization reaction, cooling system 12 is provided to remove excess heat, i.e., the heat of reaction. Excess heat needs to be removed to achieve the desired degree of polymerization and the desired reaction speed while keeping the temperature below that at which the polymer would go into solution, foul the reactor, or reduce the heat transfer coefficient.

Coolant system 12 removes heat from the loop reactor 14 via reactor jackets 16A-16H. Coolant system 12 provides coolant supply 22 to reactor jackets 16A-16H and receives coolant return 24 from reactor jackets 16A-16H. The coolant return 24 carries the heat removed from the reactor 14. The coolant system 12 transfers this heat to a utility cooling medium, such as to cooling tower water or sea water. The coolant system 12 then delivers fresh coolant supply 22 to the reactor jackets. In an aspect, the features and methods of this disclosure are applicable to vertical loop reactors and horizontal loop reactors.

In an aspect, the coolant supply 22 temperatures may range from about 85° F. to about 200° F. and the coolant return 24 temperatures may range from about 115° F. to about 195° F., for example. Coolant may be circulated through the coolant system 12 and through the reactor jackets 16A-16H, for example, by a centrifugal pump (not shown). Circulation of coolant requires a sufficiently sized pump to move the cooling fluid through the cooling jacket at the rate necessary to maintain sufficient heat exchange to control the polymerization process.

As provided in this disclosure, one method for improving the efficiency of such as cooling system includes reducing the resistance to coolant fluid flow by reducing the roughness of the internal surface of the jacket pipe, the external surface of the reactor pipe, the spacers within the annulus, or a combination thereof, for example, by polishing or applying a friction-reducing coating. In this aspect, for example, the external surface of the reactor pipe, the internal surface of the jacket, the at least one spacer, or any combination thereof are independently modified by polishing or by coating with a friction-reducing coating to reduce their unmodified surface roughness to a respective modified surface roughness ($R_a$).

When any of the internal surfaces that contact the coolant during coolant flow are modified by polishing or by coating with a friction-reducing coating to reduce their unmodified surface roughness, the modified surface roughness ($R_a$) of the surface, such as the external surface of the reactor pipe, the internal surface of the jacket, the at least one spacer, or any combination thereof, can be 0.00010 microns or less, 0.00008 microns or less, or 0.00006 microns or less, or any ranges therebetween. According to a further aspect, the modified surface roughness ($R_a$) of the external surface of the reactor pipe, the internal surface of the jacket, the at least one spacer, or any combination thereof is at least 50% less than, at least 60% less than, or at least 70% less than the respective unmodified surface roughness.

When polishing or by coating of the internal surfaces that contact the coolant during coolant flow with a friction-reducing coating, the modified (polished and/or coated) surfaces can provide a total coolant pressure drop through the coolant system that is 20% lower, 18% lower, 15% lower, or 12% lower than a corresponding total coolant pressure drop through an identical coolant system having the unmodified surface roughness. In a further aspect, the polished and/or coated spacers can have a drag coefficient that is less than 1.5, less than 1.2, or less than 1.0.

Figure 2:
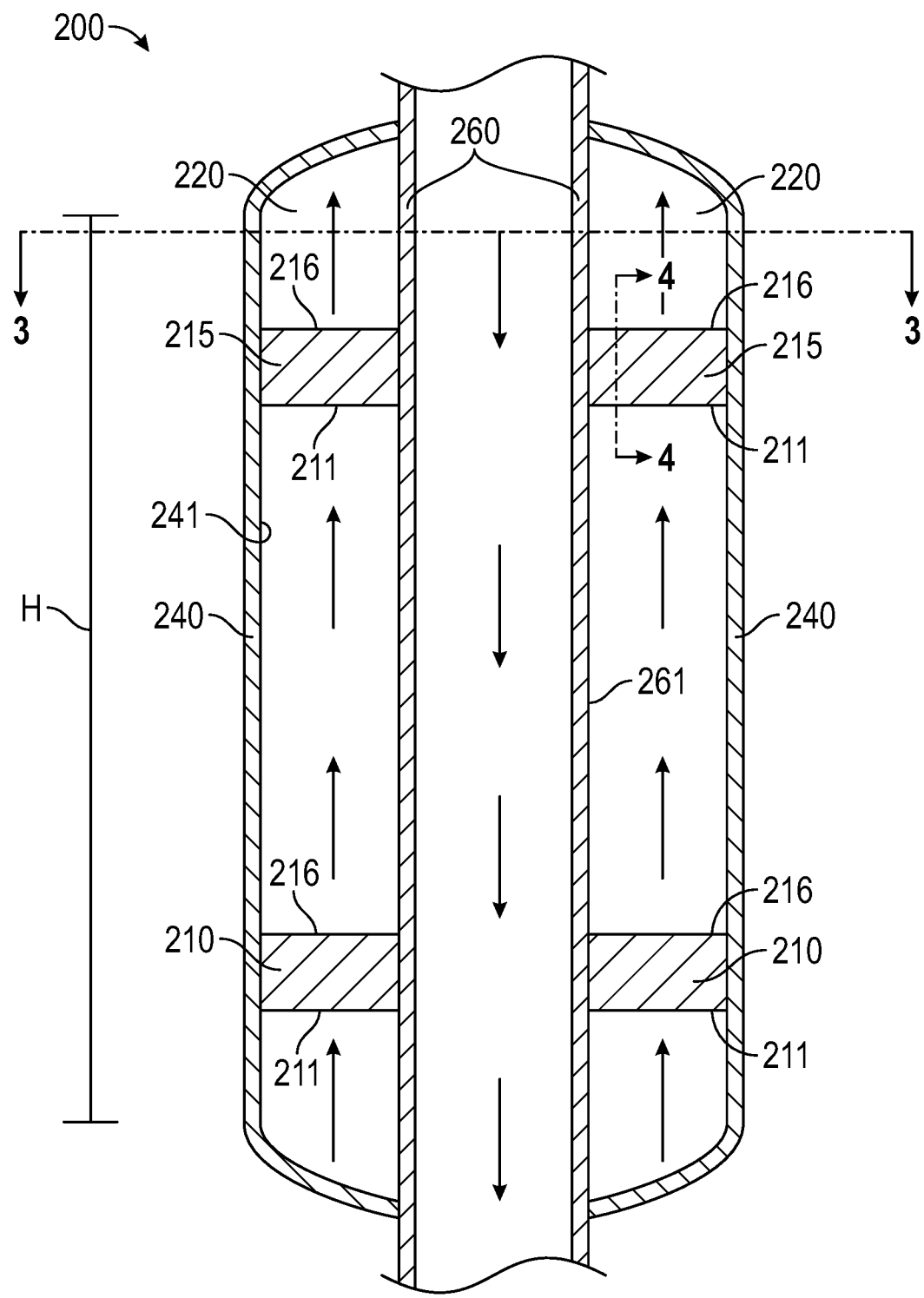
FIG. 2 illustrates a cross-sectional view of a jacketed section of a loop reactor system according to one embodiment taken along line 2-2 of FIG. 1, viewed perpendicular to the direction of fluid flow.

FIG. 2 illustrates a cross-sectional view of jacketed section 16A as shown in FIG. 1. The loop reactor system 200 comprises the loop reactor pipe 260 covered at least in part by coolant system jacket (or jacket pipe) 240 to form an annulus 220 between an internal surface 241 of the coolant system jacket 240 and an external surface 261 of the loop reactor pipe 260 through which a coolant fluid flows (as shown by the directional arrows of FIG. 2, generally illustrating fluid flow in the annulus 220) to remove heat of reaction from the loop reactor pipe 260. The heat of reaction is removed by contacting the coolant fluid with at least a portion of the external surface 261 of the inner pipe 260. The coolant fluid generally also contacts at least a portion of the internal surface 241 of the coolant system jacket 240 (also termed the reactor jacket) as well.

In a typical cooling jacket, spacers are provided approximately every 8 to 12 feet to connect the cooling jacket to the reactor pipe. Typical spacers comprise simple metal beams that are connected to both the reactor pipe 260 and the coolant system jacket 240. Conventional spacers have generally been rectangular or square in cross section, having four sides connected by 90-degree (90°) angles. These spacers, while necessary, retard fluid flow and result in a pressure drop across the coolant system. Therefore, one or more aspects of the disclosure provide for shaping or remodeling the spacer and/or one or more surfaces in the cooling jacket to reduce drag resulting in less pressure loss, which can be used in addition to or in place of the other disclosed methods for improving cooling efficiency such as polishing the internal surfaces.

As described herein, and with continued reference to FIG. 2, a plurality of spacers 210 and 215 respectively having a leading edge 216 and a trailing edge 211 are disposed within the annulus 220, between the reactor pipe 260 and the coolant system jacket 240. The specific embodiment illustrated in FIG. 2 shows a first section of lower spacers 210 disposed within the lower section (i.e., the lower half of the height of the jacket, as designated by the height (H) of the coolant system jacket 240) of the annulus 220 and a second section of upper spacers 215 disposed within an upper section (i.e., the upper half of the height of the jacket, as designated by the height (H) of the coolant system jacket 240) of the annulus 220. According to one embodiment, in a commercial slurry loop reactor, the spacers used to secure the coolant system jacket 240 to the reactor pipe 260 can be periodic, for example, every 10 feet, along the entire length (or substantially the entire length) of the vertical legs of slurry loop reactor 14. According to one embodiment, the heat exchange coolant system jacket 240 can comprise generally any number of spacers, for example, at least 4 spacers, at least 8 spacers, at least 12 spacers, at least 16 spacers, or, from 4 to 24 spacers.

Figure 3:
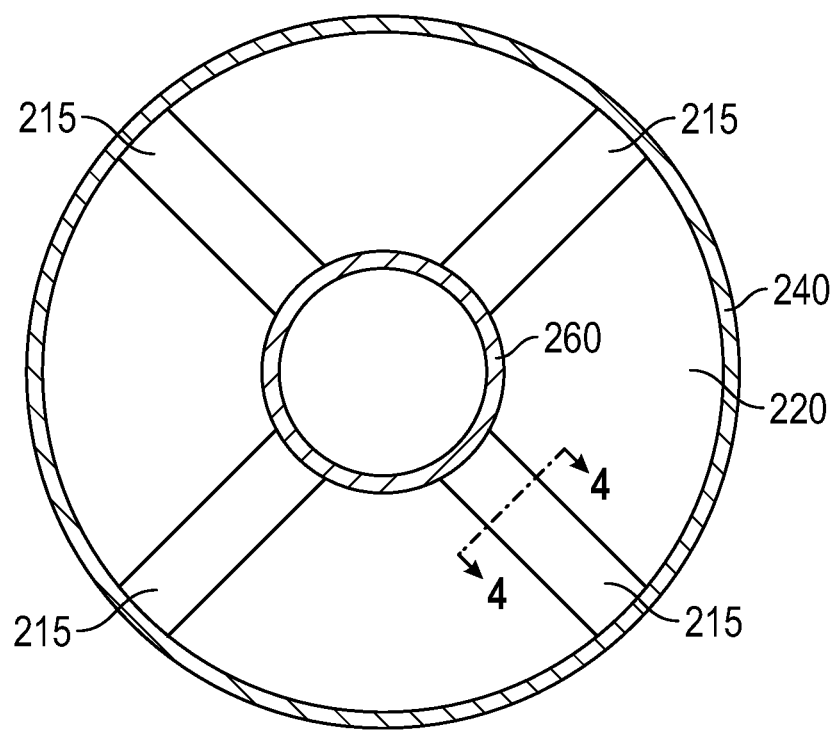
FIG. 3 illustrates a top view of a portion of a jacketed section of a loop reactor system according to one embodiment of the present disclosure, taken along line 3-3 of FIG. 1, and seen parallel to the direction of fluid flow, which is also shown in FIG. 2 for ease of understanding.

FIG. 3 illustrates a sectioned top view of spacers 215 from the loop reactor system 200 of FIG. 2, taken along line 3-3. In the FIG. 3 view, only the upper spacers 215 disposed within an upper section (i.e., the upper half of the height of the jacket) are visible. Upper spacers 215 are seen to couple the coolant system jacket 240 and the reactor pipe 260 within the annulus 220. Because coolant flow is from behind the page in FIG. 3 toward the viewer as seen in FIG. 2, the top view of spacers 215 is a view of the trailing edge of the spacers.

Therefore, one or more aspects of the disclosure include treating the reactor jacket and/or components thereof to reduce the surface roughness thereof. Surface roughness, also referred to herein as "roughness", is a measure of the texture of a surface. It is quantified by the vertical deviations of a real surface from its ideal form. Larger deviations indicate more surface roughness, while smaller deviations indicate a smoother surface.

As used herein, the term "surface roughness" or "roughness" refers to average, one-dimensional surface roughness Ra. However, it is recognized that surface roughness can further be measured by alternative measurements, such as Rt (maximum height of the profile) and Rz (mean roughness depth (averaging of the distance between highest peaks and lowest valleys)), all of which may be reduced by embodiments described herein. The profile roughness parameter Ra is the arithmetical mean roughness of a surface average of the roughness profile, specified by the methods of standard test ISO/DIS 4287/1 and generally is reported in microns (□m). It can be represented by formula (I), below and determined by the following equation:

$$R_a = 1/n \sum_{i=1}^{n} |y_i| \tag{I}$$

The equation for roughness profile contains n ordered, equally spaced points along the trace, and yi is the vertical distance from the mean line to the ith data point. Height is assumed to be positive in the up direction, away from the bulk material.

In one or more embodiments, and in reference to FIG. 2, the internal surface of the reactor jacket 241, the external surface of the loop reactor pipe 261, the one or more spacers 210, 215 or a combination thereof, can be treated (including treated by polishing) to reduce the surface roughness ($R_a$) thereof. In one or more embodiments, the internal surface of the reactor jacket 241 and one or more spacers are treated to reduce a surface roughness ($R_a$) thereof.

The treatment to reduce surface roughness may include any suitable treatment known to one skilled in the art to reduce surface roughness of a material. The treatment to reduce surface roughness can include, for example, coating or polishing. Examples of polishing treatments may include mechanical, electrochemical or chemical polishing. Likewise, the treatment may include coating the surface with one or more materials that when dried form a smooth surface.

According to one embodiment, the treatment to reduce surface roughness results in a surface having a surface roughness that is at least 50%, or at least 60%, or at least 70%, or at least 75%, or at least 80%, or at least 85%, or at least 90%, or at least 95%, or at least 98%, or at least 99% lower than that of the untreated surface. Upon treatment, the surface roughness of the treated material, such as the one or more spacers, the internal surface or combinations thereof, may be 1×10−4 microns (□m) or less, or 0.5×10−3 microns or less, or 1×10−5 microns or less, or 0.5×10−4 microns or less, or 1×10−6 microns or less (as measured by ASTM D7127-13), for example.

The treatment to reduce surface roughness generally results in a total coolant pressure drop through the reactor system (i.e., the sum of all pressure drops through each reactor jacket/outer pipe within the reactor system) that is lower than an identical system absent the treatment to reduce surface roughness. For example, the total coolant pressure drop may be at least 10%, or at least 15%, or at least 20%, or at least 25%, or at least 30%, or at least 35%, or from 15% to 90%, or from at least 20% to at least 80% less than the total coolant pressure drop through an identical reactor system absent the treatment to reduce surface roughness. In one or more specific embodiments, for reactors having a volume of at least about 35,000 gallons or a capacity of greater than about 125,000 lbs/hour, the total coolant pressure drop through the reactor system is less than 15 psi, or less than 13 psi, or less than 11 psi, or less than 10 psi, or less than 9 psi, or less than 8 psi, or less than 7 psi, for example.

Further, treating the spacers to reduce surface roughness thereof generally results in a spacer pressure drop (i.e., the coolant pressure drop as it passes over each spacer, such as from the leading edge to a trailing edge of the spacer) that is lower than that of an identical spacer absent the treatment to reduce surface roughness. For example, in one or more embodiments, the total spacer pressure drop (i.e., the sum of all spacer pressure drops though each reactor jacket within the reactor system) is less than 20%, or less than 15%, or less than 12%, or less than 10% of the total coolant pressure drop through the reactor system. In one or more embodiments, the coolant pressure drop per leg of the loop reactor is less than about 2.0 psi (13.8 kPa), or less than about 1.75 psi (12.1 kPa), or less than about 1.6 psi (11.0 kPa), or less than about 1.5 psi (10.3 kPa), or less than about 1.4 psi (9.7 kPa), or less than about 1.3 psi (8.9 kPa), for example.

Also provided in this disclosure is a method for improving the efficiency of such as cooling system by reducing the resistance to coolant fluid flow, which can be accomplished by shaping the spacers, particularly shaping the cross-section of the spacers, for improved hydrodynamic performance and coolant fluid flow. In this aspect, for example, at least one spacer can be modified by shaping the spacer in cross section to provide a curved or partially curved leading edge. In another aspect, at least one spacer is modified by shaping the spacer in cross section to provide a curved or partially curved leading edge, and a tapered or partially tapered trailing edge.

When a spacer is shaped as described herein to improve their hydrodynamic performance, the spacer can have a fineness ratio of at least about 2, at least about 2.5, at least about 3.0 or at least about 3.5. Moreover, when both the leading edge is curved or at least partially curved and the trailing edge is tapered or at least partially tapered, the surface area of the curved or partially curved leading edge can be greater than, equal to, or less than the surface area of the tapered or partially tapered trailing edge.

In a further aspect, the leading edge of a spacer can comprise a radius of less than about 5.0 inches, less than about 4.5 inches, or less than about 4.0. In another aspect, the leading edge of a spacer can be shaped to reduce at least one radius by at least 30%, at least 37% or by at least 45% from a 90° angle, that is, based upon a square or rectangular cross section with no radius applied to the 90° angle of the cross section.

When spacers are shaped to be more hydrodynamic as described herein, and the coolant system comprises a plurality of spacers configured as disclosed, they can provide a venturi effect when the coolant flows over the plurality of spacers. In this aspect, the pressure drop across any single spacer can be less than about 12%, less than about 10%, or less than about 8% of a total coolant pressure drop through the reactor system. In a further aspect, a spacer or a plurality of spacers can be modified and/or shaping to have a drag coefficient of each modified and/or shaped spacer of less than 1.28, less than 1.22, or less than 1.18.

Figure 4:
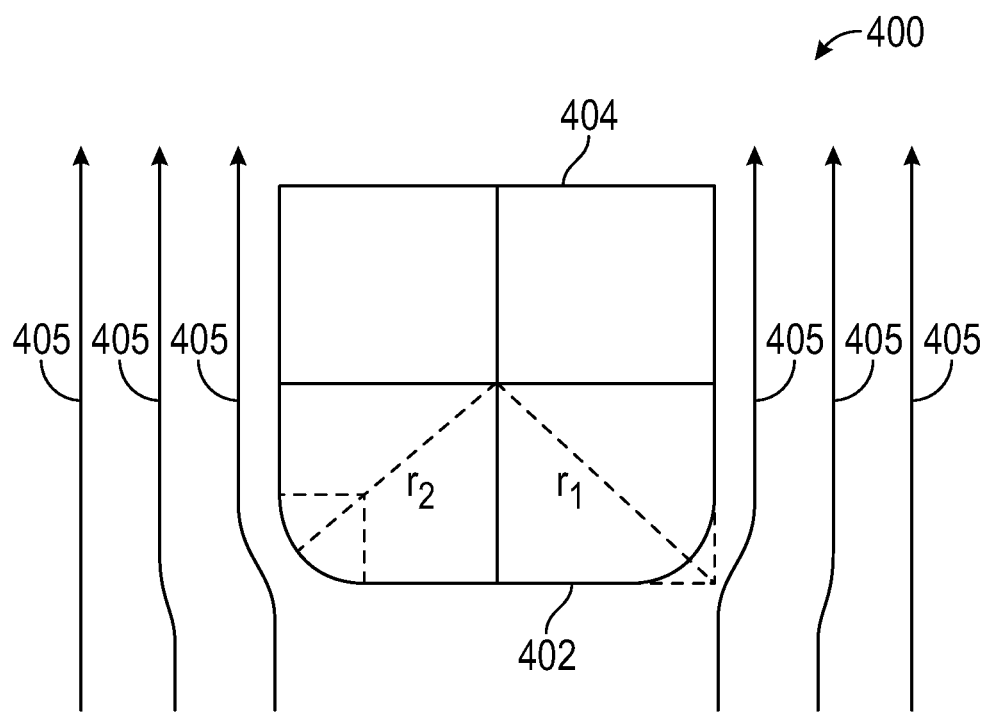
FIG. 4 illustrates a cross-sectional area of an exemplary spacer according to one embodiment of the present disclosure taken along line 4-4 of FIG. 3, which is also shown in FIG. 2 for ease of understanding. This view is along or parallel to the length of the spacer between the loop reactor pipe 260 and the coolant system jacket 240, and viewed perpendicular to the direction of flow, and showing a curved leading edge of the spacer.
Figure 5:
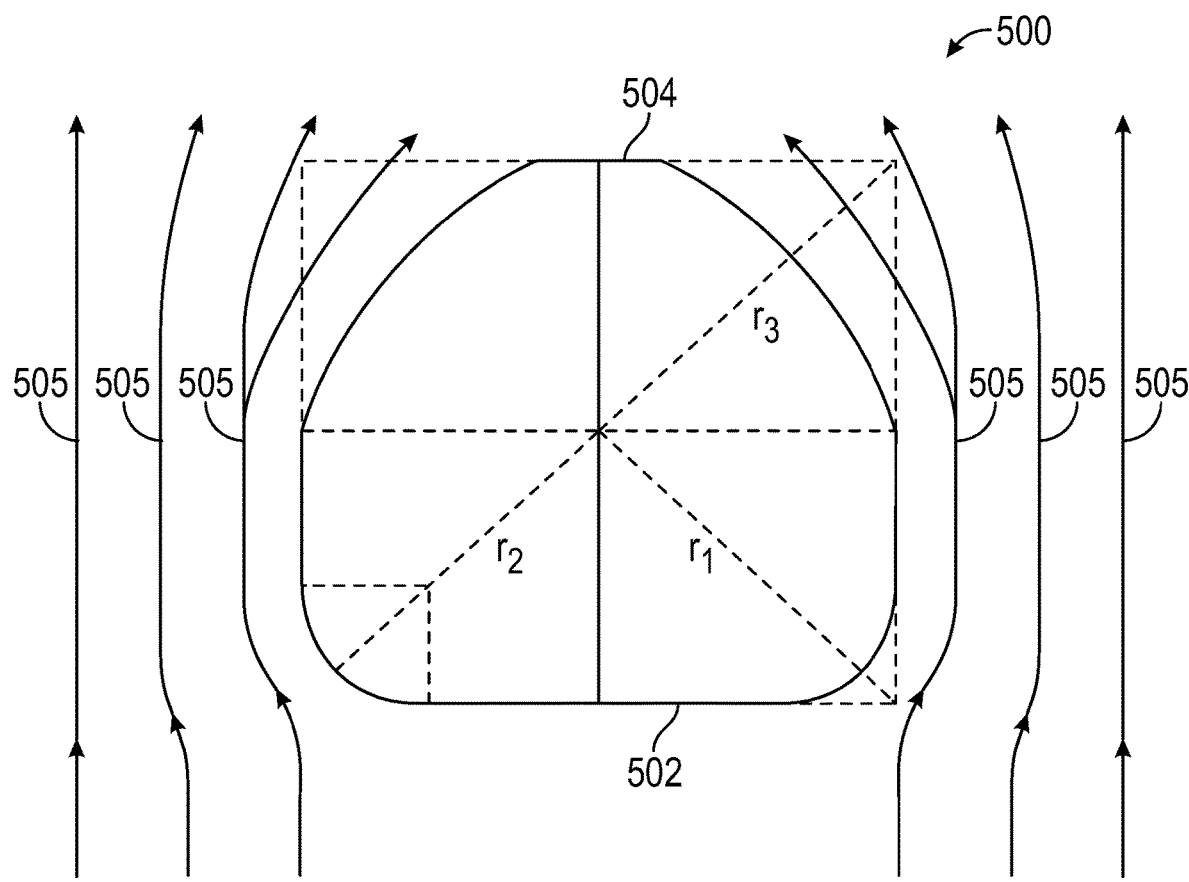
FIG. 5 illustrates a cross-sectional area of another exemplary spacer according to another embodiment of the present disclosure, taken perpendicular to the length of the spacer between the loop reactor pipe 260 and the coolant system jacket 240, and viewed perpendicular to the direction of flow and showing a curved leading edge and a tapered or partially tapered trailing edge of the spacer.

This aspect of the disclosure of shaping the spacers is illustrated, for example, in FIG. 4 and FIG. 5. FIG. 4 illustrates a cross-sectional area of an exemplary spacer 400 according to one embodiment of the present disclosure, taken perpendicular to the length of the spacer between the loop reactor pipe 260 and the coolant system jacket 240, and viewed perpendicular to the direction of flow, and showing a curved leading edge of the spacer. For example, FIG. 4 can represent a cross-sectional view of the spacers such as 210 and 215 of FIG. 2 and FIG. 3. In the embodiment illustrated in FIG. 4, the spacer 400 has a leading edge 402 and a trailing edge 404. Leading edge 402 in FIG. 4 is the first portion of the spacer to contact the coolant as it circulates through the annular space 220, and the trailing edge 404 in FIG. 4, is the final portion of the spacer to contact the coolant, as illustrated by coolant flow lines 405.

As illustrated in FIG. 4, the leading edge 402 of the spacer has been shaped to provide a more hydrodynamic shape for the coolant to pass over. The leading edge 402 is shown shaped (or "modeled" or "remodeled") to reduce at least one radius thereof. In the embodiment of FIG. 4, the leading edge 402 results in a radius $r_2$ that is less than the original radius thereof, $r_1$ of an unshaped 90° corner of a square or rectangular cross-section of a conventional spacer. In place of the unshaped 90° corner is a reshaped leading edge 402 which is reshaped to provide an arcuate profile in place of the 90° corners. Reshaping of the spacers in this manner, typically by standard mechanical remodeling means, reduces the form drag, sometimes referred to as the pressure drag, in fluid flow caused by the spacers.

FIG. 5 illustrates a cross-sectional area of another exemplary spacer according to embodiments of the present disclosure, taken perpendicular to the length of the spacer between the loop reactor pipe 260 and the coolant system jacket 240, and viewed perpendicular to the direction of flow and showing a curved leading edge and a tapered or partially tapered trailing edge of the spacer. In FIG. 5, spacer 500 has a leading edge 502 and a trailing edge 504. As seen in this embodiment, the spacer 500 has been shaped to provide arcuate profiles at both the leading edge 502 and the trailing edge 504. In this aspect, this shape may be referred to as a curved or partially curved leading edge and a tapered or partially tapered trailing edge. As illustrated in FIG. 5, coolant flow 505 passes more easily around the spacer 500 and forms a smaller wake than the wake formed when coolant flow passes around a non-shaped spacer or even the spacer 400 of FIG. 4.

Referring still to FIG. 5, radius $r_1$ represents the original radius of an essentially square (or rectangular) spacer measured to a 90° corner. Radius $r_2$ represents the change in radius resulting from reshaping the corners of the essentially square spacer to form arcuate areas on the leading edge of the spacer 502. Radius $r_3$ represents an alternative radial length that results from reshaping the corner of the essentially square (or rectangular) spacer on the trailing edge 504. As can be seen in the embodiment in FIG. 5, the trailing edge 504 has a substantially shorter radius than the leading edge 502.

Figure 6:
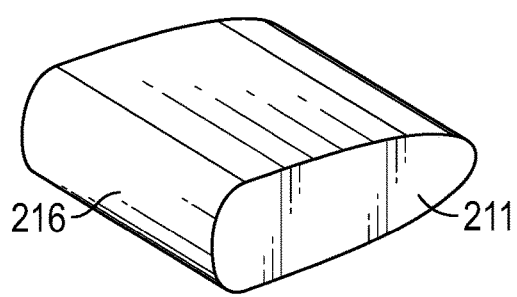
FIG. 6 illustrates a front perspective view of a section of a spacer according to one embodiment of the present disclosure, showing the leading edge 216 which is contacted by the cooling fluid first and the trailing edge 211. Fluid flow in FIG. 6 is from a rounded front leading edge toward a rounded but narrower rear trailing edge of the spacer. The narrower rear trailing edge of the spacer in FIG. 6 is not nearly as tapered or narrow as the rear trailing edge of the spacer in FIG. 7.
Figure 7:
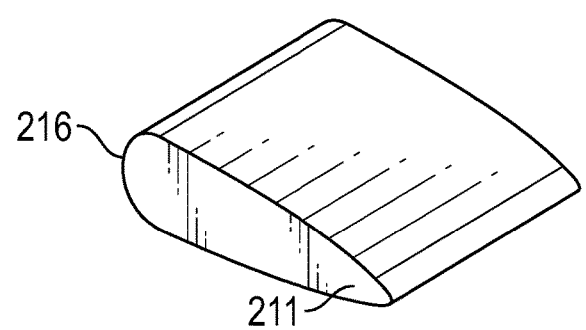
FIG. 7 illustrates a rear perspective view of a section of a spacer according to one embodiment of the present disclosure, showing the leading edge 216 which is contacted by the cooling fluid first and the trailing edge 211. Fluid flow in FIG. 7 is from a rounded front leading edge toward a much more substantially tapered and narrow rear trailing edge of the spacer as compared to the trailing edge of the spacer shown in FIG. 6.

FIG. 6 and FIG. 7 show two possible embodiments of a hydrodynamic spacer 210 or 215 having the leading edge 216 and the trailing edge 211. FIG. 6 illustrates a portion of a spacer according to an embodiment of the present disclosure, showing a rounded, thicker leading edge 216 which is contacted by the cooling fluid first and a rounded but narrower rear trailing edge of the spacer. FIG. 7 is similar to FIG. 6, however the trailing edge profile has been more significantly narrowed and tapered to improve its hydrodynamic profile. Therefore, FIG. 7 illustrates a rear perspective view of a portion of a spacer according to an embodiment of this disclosure, showing the leading edge 216 which is contacted by the cooling fluid first and much more substantially tapered and narrow rear trailing edge of the spacer as compared to the trailing edge of the spacer shown in FIG. 6. This additional taper in the FIG. 7 spacer can provide, for example, improved hydrodynamic efficiency.

When spacers are shaped to be more hydrodynamic as illustrated in FIG. 6 and FIG. 7, in some embodiments it is not necessary that the leading edge of a spacer be thicker than the narrower trailing edge for enhancements in cooling efficiency to be realized. For example, in the embodiments illustrated in FIG. 6 and FIG. 7, hydrodynamic efficiencies are also obtained when coolant flow is in the reverse direction from that described above. That is, coolant flow can occur from the a narrow leading edge of the spacer toward the thicker trailing edge of the spacer.

In a further aspect, for example, a plurality of spacers which are configured as disclosed may provide a venturi effect. Such an effect can occur, for example, when there is a tapering from a thicker leading edge toward a narrow trailing edge, or from a narrower leading edge toward a thicker leading edge, when the plurality of spacers are configured and spaced apart to provide a venturi effect when the coolant flows over the plurality of spacers.

Figure 8:
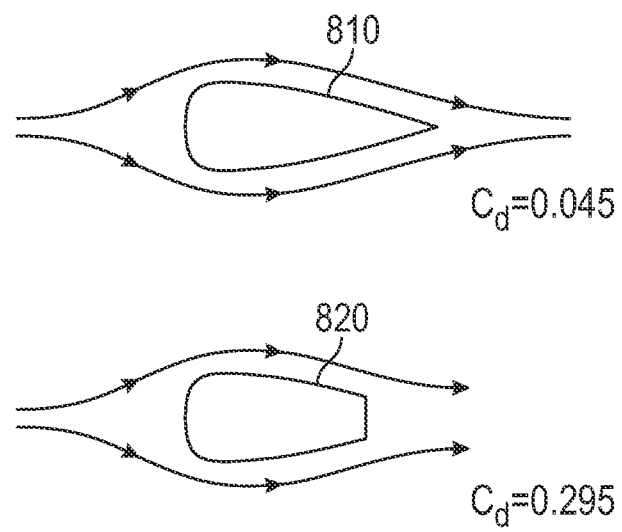
FIG. 8 illustrates two possible exemplary fluid flow patterns around differently shaped spacers, in accordance with the present disclosure. Specifically.

FIG. 8 illustrates another aspect of this disclosure, specifically, two possible exemplary fluid flow patterns around differently shaped spacers, shown in cross section in FIG. 8. Specifically, the FIG. 8 cross-section is taken perpendicular to the length of the spacer between the loop reactor pipe and the coolant system jacket pipe, and viewed perpendicular to the direction of flow. This figure demonstrates, for example, that the drag coefficient of a streamlined body is lower when the boundary layer of the fluid around the body remains attached to the surface of the body for as long as possible. A streamlined body with low form drag will have a narrow wake, while a body with high form drag would exhibit a broad wake. This is illustrated in FIG. 8 which shows a first spacer 810 has a drag coefficient of 0.045, while the second spacer 820 has a drag coefficient of 0.295. As can be seen from the flow lines, the wake at the end of the spacer 810 is smaller with little or no area of stagnation or pressure drop occurring at the trailing end of the spacer. Spacer 820 would have a larger wake and an area of stagnation on the flat trailing end.

Current spacers produced from squared or rectangular beams have a drag coefficient of approximately 2.0 at a theoretical laminar flow. In embodiments as described, one or more spacers are shaped to provide a drag coefficient of less than 1.50, or less than 1.40, or less than 1.30, or less than 1.28, or less than 1.25, or less than 1.20, or less than 1.10, for example less than 1.0, for example, less than 0.5, for example, less than 0.1, when at theoretical laminar flow. Drag coefficient is a dimensionless quantity that is used to quantify the drag (or resistance) of an object in a fluid environment. One of skill in the art would understand that the measured parameters used to calculate the dimensionless numbers referenced herein are converted to consistent units which cancel out to provide the dimensionless number. For example, drag coefficient can be determined by the following equation:

$$C_d = \frac{2F_d}{\rho V^2 \frac{A}{2}} \text{ or } \frac{F_d}{1/2 \rho V^2 A}$$

where $F_d$ is the drag force (i.e., the force component in the direction of the flow velocity) as measured in units known to one skilled in the art, such as, for example, N; $\rho$ is the density of the fluid as measured in units known to one skilled in the art, such as, for example, kg/m$^3$; V is the speed of the object relative to the fluid as measured in units known to one skilled in the art, such as, for example, m/s; and A is the reference area as measured in units known to one skilled in the art, such as, for example, m$^2$.

According to another embodiment, the hydrodynamic profile of the spacers can be defined by their fineness ratio. The term "fineness ratio" describes the overall shape of a streamlined body. As used herein, the fineness ratio is the ratio of the length of the spacer to its maximum width. The higher the fineness ratio, the more streamlined the body and the lower the drag coefficient. According to one embodiment, the spacer has a fineness ratio of at least about 2, for example, at least about 3, for example, at least about 4, for example, at least about 5, for example, at least about 6, for example at least about 7. As the length of the spacer increases while the width of the spacer stays constant, the disruption of flow over the spacer will become smaller and the wake following the spacer will be smaller. Fineness ratio is only one means for improving drag properties. Drag may also be affected by the angle of incidence between the spacer and the flowing fluid.

Figure 9:
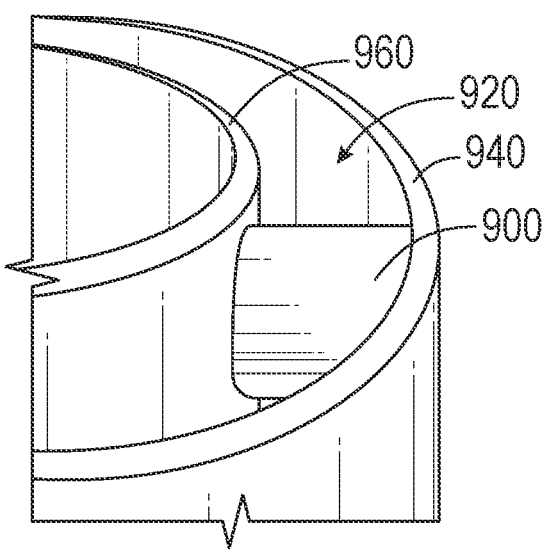
FIG. 9 illustrates a partial, cutaway perspective view of an embodiment of the reactor system of the present disclosure, showing the reactor pipe, the jacket pipe, the annulus therebetween, and a spacer situated between the inside wall of the jacket pipe and the outside wall of a reactor pipe.
Figure 10:
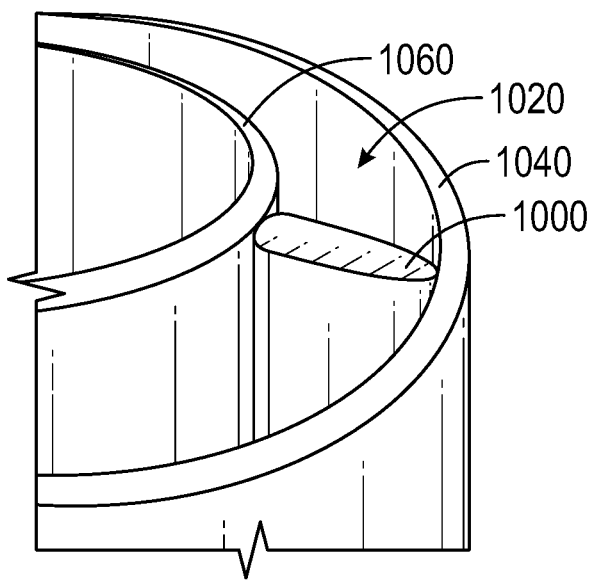
FIG. 10 illustrates a partial, cutaway perspective view of another embodiment of the reactor system of this disclosure, showing the reactor pipe, the jacket pipe, the annulus therebetween, and a spacer situated between the inside wall of the jacket pipe and the outside wall of a reactor pipe, in which the spacer is oriented 90° from the spacer illustrated in FIG. 9.

FIG. 9 illustrates a partial, cutaway perspective view of an embodiment of the reactor system of the present disclosure, showing the reactor pipe 960, the jacket pipe 940, the annulus 920 therebetween, and a spacer 900 situated between the inside wall of the jacket pipe and the outside wall of a reactor pipe. In this figure, fluid flow is from bottom to top of the annulus between the reactor pipe and the jacket pipe, and the therefore leading edge of the spacer is oriented down toward the bottom of the figure. The downward-facing leading edge in FIG. 9 is thicker than the more narrow upward-facing trailing edge. FIG. 10 illustrates a partial, cutaway perspective view of another embodiment of the reactor system of this disclosure, showing the reactor pipe 1060, the jacket pipe 1040, the annulus 1020 therebetween, and a spacer 1000 situated between the inside wall of the jacket pipe and the outside wall of a reactor pipe, which can be understood by rotating the spacer from FIG. 9 by 90° and altering the overall length distance from the leading edge to the trailing edge, to provide the spacer of FIG. 10.

According to one embodiment, the spacers may be disposed within the annulus in multiple horizontal planes. For example, the plurality of spacers may be disposed in 2, 3, 4 or more horizontal planes within the annulus. According to another embodiment, spacers may be arranged out of horizontal alignment with one another and and/or not arranged in multiple horizontal planes. For example, spacers may be arranged out of horizontal alignment by adding a pitch to the spacer. As used herein, a pitch is the angle away from the horizontal assumed by the spacer. Referring to FIG. 2, a spacer that starts at the reactor 260 and crosses the annulus 220 perpendicular to the jacket has a pitch of zero. The same spacer crossing the annulus from the reactor 260 to the jacket 240 at a 30-degree pitch has either a 30-degree angle or 150-degree angle depending upon the assignment of the direction of the pitch.

This concept of pitch can be further demonstrated by reference to FIG. 5, which illustrates a cross-section of an exemplary spacer 500 taken perpendicular to the length of the spacer between the loop reactor pipe and the coolant system jacket, showing leading edge 502, trailing edge 504, and coolant flow 505. When viewed in this cross-section, pitch can be imparted to this spacer by rotating the spacer around the axis coinciding with the length of the spacer which extends between the loop reactor pipe 260 and the coolant system jacket 240. In other words, when viewed in the FIG. 5 cross-section, imparting pitch to spacer 500 is accomplished by rotating the spacer about an axis extending out of and perpendicular the paper of FIG. 5. In this aspect, for example, a pitch angle away from horizontal can be imparted to one or more spacers of about 5 degrees, about 10 degrees, about 15 degrees, about 20 degrees, about 25 degrees, about 30 degrees, about 35 degrees, or about 40 degrees away from horizontal. Such pitch further deflects the fluid flow and when multiple spacers are similarly pitched, an improved effect on coolant flow can be obtained. According to an aspect, a spacer also can have a pitch of at least 5 degrees, for example, at least 10 degrees, for example at least 15 degrees, for example at least 20 degrees. In another aspect, a spacer has a pitch of from 1 degree to 30 degrees, from 3 degrees to 25 degrees, or from 5 degrees to 20 degrees.

The spacers may be formed of a variety of materials, such as ceramic or stainless steel. In one or more embodiments, the spacers can be formed of carbon or low-alloy steels, such as those illustrated in Table 1 below.

TABLE 1

| Steel | Thermal conductivity (Btu/hr * F * ft) | Minimum Tensile Strength (psi) |
|---|---|---|
| A516 Gr70 | 27.8 | 70,000 (482.6 MPa) |
| A537 Cl2 | 26.8 | 80,000 |
| A202 Gr B | 23.9 | 85,000 |
| A285 Gr C | 30.1 | 55,000 |
| A514 Gr B | 27.4 | 110,000 |
| A515 Gr 70 | 27.2 | 70,000 |
| A517 GR A | 24.1 | 115,000 |
| A517 Gr B | 27.5 | 115,000 |
| A533 Ty A Cl 3 | 27.6 | 100,000 |
| A542 Ty A Cl 2 | 21.5 | 115,000 |
| A678 Gr C | 25.7 | 95,000 |

Further, the spacers may be formed of a material having a minimum tensile strength of at least 50,000 psi (344.7 MPa). In one or more embodiments, the spacers may be formed of a material having a minimum tensile strength of from 60,000 psi (413.7 MPa) to 90,000 psi (620.5 MPa). Minimum tensile strengths are taken from "Lukens 1988-89 Plate Steel specification Guide," Lukens Steel Co., Coatesville, Pa., 1988.

As described above, the cooling jackets 16A-16H or their components can be fabricated or modified to improve the drag properties associated with form or pressure friction. According to an aspect, the cooling jackets can be created or modified to improve drag due to surface friction, for example, by polishing or coating with a friction-reducing coating. According to yet another aspect, the jackets and their components may be both reshaped to be more hydrodynamic as well as being treated to reduce surface friction. Heat exchange jackets according to aspect have one or more surfaces that are treated to improve the surface friction and one or more reshaped spacers to thereby improve flow of the coolant and reducing or minimized pressure drop.

Referring again to FIG. 4 and FIG. 5, aspects of shaping the spacer are illustrated. For example, in FIG. 4 and FIG. 5, shaping or rounding of the leading edge is shown to enhance the hydrodynamic performance and efficiency of the spacer. For example, the edge may have a radius that is smaller than unpolished spacers. For example, the treated edge, such as the leading edge, the trailing edge, or a combination thereof, may have a radius of less than 5 inches (12.7 cm), or less than 4 inches (10.2 cm), or less than 3 inches (7.6 cm), or less than 2 inches (5.1 cm), or less than 1 inch (2.5 cm), or less than 0.75 inches (1.9 cm), or less than 0.5 inches (1.3 cm), or less than 0.25 inches (0.6 cm). In one or more embodiments, the treated edge is polished to reduce a radius thereof by at least 10%, or at least 20%, or at least 25%, or at least 30%, or at least 40%, or at least 50%, for example.

Also provided in this disclosure is another method for improving the efficiency of such as cooling system includes reducing the resistance to coolant fluid flow by providing protrusions or protuberances extending from the external surface of the reactor pipe and/or the internal surface of the jacket pipe into a portion of the annular space. This aspect includes where the protrusions are matched with a corresponding protrusion on the opposite side of the annulus, particularly with a curved or partially curved leading edge, and a tapered or partially tapered trailing edge, to create a venturi effect from the coolant flow.

Therefore, in accordance with a further aspect, this disclosure provides for a reactor system, wherein at least one of the external surface of the reactor pipe and/or the internal surface of the jacket can be independently further modified by the addition of one or more protrusions which extend from the internal surface of the jacket and/or the external surface of the reactor pipe into a portion of the annular space to create a venturi effect from the coolant flow. In an aspect, the at least one protrusion can be shaped to provide a curved or partially curved leading edge. In another aspect, the at least one protrusion can be shaped to provide a curved or partially curved leading edge, and a tapered or partially tapered trailing edge.

Figure 11:
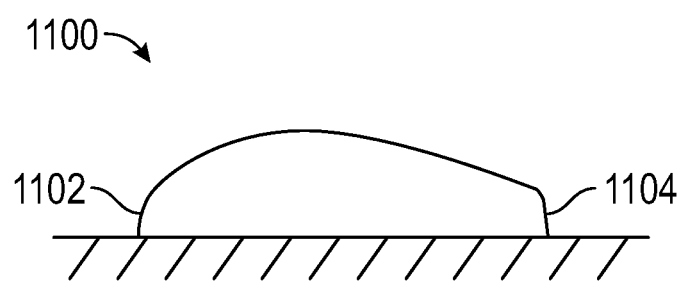
FIG. 11 illustrates a cross-sectional area of a protrusion or protuberance resembling a shaped bulge, according to an embodiment of the present disclosure, the bottom of which is attached to the curved sidewall of the internal surface of the jacket or the external surface of the loop reactor, and which extends into the annular space. In this embodiment, the protrusion is shaped to provide a curved leading edge and a partially tapered trailing edge. Fluid flow is from left-to-right in FIG. 11, that is, from the leading edge to the trailing edge.

FIG. 11 provides one illustration of this aspect of the disclosure, showing a cross-sectional area of a protrusion or protuberance resembling a shaped bulge, the bottom of which is attached to the curved sidewall of the internal surface of the jacket or the external surface of the loop reactor, and which extends into the annular space. Illustrated in FIG. 11 are protrusion 1100, leading edge 1102 of protrusion 1100, and trailing edge 1104 of protrusion 1100. In this embodiment, protrusion 1100 is shaped to provide a curved leading edge 1102 and a tapered or partially tapered trailing edge 1104. Fluid flow is from left-to-right in FIG. 11, that is, from the leading edge 1102 to the trailing edge 1104.

FIG. 8 is discussed above in terms of illustrating two possible exemplary fluid flow patterns around differently shaped spacers, specifically, the cross-sectional areas of two exemplary spacers taken perpendicular to the length of the spacer. In an aspect, FIG. 8 can also illustrate a top view of two different shaped protrusions or protuberances shown attached to the external wall of the reactor pipe or the internal wall of the jacket pipe, demonstrating the improved fluid flow with the trailing edge is tapered and the leading edge is curved. The flow patterns in this instance are flow adjacent the wall to which the protrusion extends from and not over the top of the protrusion.

In a further aspect, the one or more protrusions can comprise or can be one or more continuous protrusions extending from the internal surface of the jacket and/or the external surface of the reactor pipe in a circular fashion. That is, a raised surface in the form or a ring or circle can be added to the internal surface of the jacket and/or the external surface of the reactor pipe. The ring can have a curved or partially curved leading edge, or in another aspect, the ring can have curved or partially curved leading edge, and a tapered or partially tapered trailing edge, with respect to coolant flow.

According to a further aspect, the reactor system can include a continuous protrusion extending from the internal surface of the jacket and a corresponding continuous protrusion extending from the external surface of the reactor pipe which are spaced at substantially the same height along the jacket and reactor pipe, respectively, to provide a venturi effect when the coolant flows between the protrusions.

In still another aspect, this disclosure provides for one or more discontinuous protrusions extending from external surface of the reactor pipe and/or the internal surface of the jacket pipe into a portion of the annular space in a non-circular and segmented fashion. In this aspect, for example, the discontinuous protrusions can be situated and spaced at substantially the same height along the jacket and reactor pipe, respectively, to provide a venturi effect when the coolant flows between the protrusions.

Figure 12:
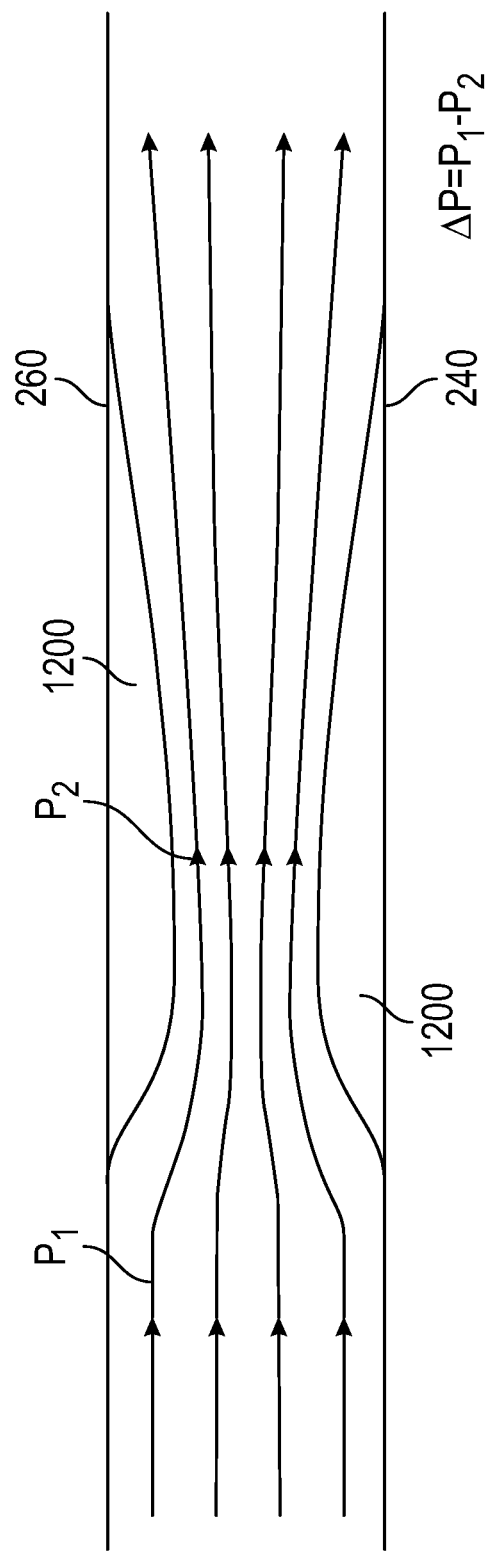
FIG. 12 illustrates a cross-sectional area of one portion of the annular space between the coolant system jacket 240 and the loop reactor pipe 260 and viewed perpendicular to the direction of coolant flow, according to an embodiment of the present disclosure This figure illustrates two opposing protrusions or protuberances, 1200, the bottoms of which are attached to the curved sidewall of the internal surface of the jacket 241 and the external surface of the reactor pipe 261, respectively, and both of which extend into the annular space. Fluid flow is from left-to-right in FIG. 12, that is, from the leading edge to the trailing edge of the protrusions, and an exemplary venturi effect that may be generated between two the protrusions are shown.

FIG. 12 illustrates this aspect of the disclosure, showing a cross-sectional area of one portion of the annular space between the coolant system jacket 240 and the loop reactor pipe 260 and viewed perpendicular to the direction of coolant flow, according to an embodiment of the present disclosure This figure illustrates two opposing protrusions or protuberances, 1200, the bottoms of which are attached to the curved sidewall of the internal surface of the jacket 241 and the external surface of the reactor pipe 261, respectively, and both of which extend into the annular space. Fluid flow is from left-to-right in FIG. 12, that is, from the leading edge to the trailing edge of the protrusions, and an exemplary venturi effect that may be generated between two the protrusions are shown. As the coolant passes between the protrusions, the pressure increases and the speed of the fluid increases. As illustrated in FIG. 12, the change in pressure such as the pressure drop can be measured by the coolant pressure before the narrow passage created by the protuberances, minus the pressure in the narrow passage.

For example, when one discontinuous protrusion extends from the internal surface of the jacket and a corresponding discontinuous protrusion extends from the external surface of the reactor pipe to comprise a paired set on opposite sides of the annulus. In this aspect, the discontinuous protrusions resemble a series or set of isolated protuberances because they are non-continuous. In an aspect, for example, the discontinuous protrusions comprise 2, 3, 4, 5, or 6 paired set on opposite sides of the annulus. In these one or more embodiments, the leading edge can have has a surface area that is less than a surface area of the trailing edge.

In one or more embodiments, the coolant flows through the annulus at an average flow velocity of at least 20,000 ft$^3$/hr (566 m$^3$/hr), or at least 25,000 ft$^3$/hr (708 cm$^3$/hr), or at least 27,000 ft$^3$/hr (765 cm$^3$/hr), or at least 30,000 ft$^3$/hr (850 cm$^3$/hr), or at least 35,000 ft$^3$/hr (991 cm$^3$/hr), for example.

Sizing of appropriate pipes/jackets and the use of appropriate coolants is well understood in the art. In one or more embodiments, the various pipes defining the reactor passageway (i.e., loop reactor pipe) may have an outside diameter of from about 10 inches to about 30 inches and a nominal wall thickness of from about 0.2 inches to about 1.0 inches, for example.

In aspects, this disclosure provides a reactor system as described herein, wherein the reactor system has a production capacity of at least about 125,000 lbs/hr and a total coolant pressure drop through the reactor system of less than about 15 psi or less than about 11 psi; and wherein at least a portion of the internal surface of the jacket is treated by polishing and has a surface roughness ($R_a$) at least 50% less than the corresponding untreated surface roughness. In this aspect, the surface roughness ($R_a$) can be 0.00010 microns or less.

Any suitable coolants may be used to remove or add heat to the reactor system. Typical coolants include steam condensate, water or combinations thereof.

The improved coolant system can be used in conjunction with any polyolefin process. A typical polyolefin process includes contacting an olefin monomer with a catalyst within a reactor system to form a polyolefin. The olefin monomers utilized in the processes described herein may be chosen from $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polyolefin may include homopolymers, copolymers or terpolymers, for example. In one or more embodiments, the olefin monomers are selected from $C_2$-$C_3$ olefin monomers. In other embodiments, the olefin monomer includes ethylene or propylene.

Catalysts may include any catalyst(s) or catalyst system(s) useful for polymerizing olefin monomers. In this aspect, for example, the catalyst may be selected from chromium based catalyst systems, single site transition metal catalyst systems including metallocene catalyst systems, non-metallocene or post-metallocene catalyst systems, nickel catalyst systems, Ziegler-Natta catalyst systems and combinations thereof. As known in the art, the catalysts may be activated for subsequent polymerization and may or may not be associated with a support material.

The polymerization conditions including equipment, process conditions, reactants, additives and other materials will vary depending on the desired composition and properties of the polyolefin being formed. Such processes may include, for example, solution phase, gas phase, slurry phase, bulk phase, high pressure processes or combinations thereof.

A pre-polymer of controlled particle size distribution made using any catalyst as described above may also be introduced to the polymerization reactor. The prepolymerization may be carried out by any suitable process, for example, polymerization in a liquid hydrocarbon diluent or in the gas phase using a batch process, a semi-continuous process or a continuous process. The conversion to prepolymer is generally carried out by bringing the catalyst into contact with one or more alpha-olefins in amounts such that the prepolymer contains between 0.002 and 10 millimoles of transition metal per gram. The prepolymer particle size may be controlled by sieving, hydrocyclone or elutriation separation of fines or large particles or other known techniques.

Embodiments may include a multiple reactor system wherein one of the reactors is a loop reactor and the second or any subsequent reactor of the multiple reactor system can be another loop reactor or can be any reactor for the polymerization of olefins, for example a fluidized-bed reactor. Similarly, the first reactor in a multiple reactor system in accordance with this disclosure can be a fluidized-bed (gas-phase) reactor, and the second (or a subsequent) reactor can be one or more loop reactors. The multiple reactor system can be used to make monomodal or multimodal polymers.

Upon removal from the reactor system, the polyolefin may be passed to a polymer recovery system for further processing, such as addition of additives and/or extrusion. Such recovery systems are known to one skilled in the art and therefore are not described in detail herein.

Slurry phase processes (also referred to as particle form polymerization) are common and generally include forming a suspension of solid, particulate polymer in a liquid polymerization medium, to which monomers and catalyst have been added. The suspension (which may include diluents) may be intermittently or continuously removed from the reaction zone, where the volatile components can be separated from the polymer and recycled, optionally after a distillation, to the reaction zone. Liquefied diluent may optionally be employed in the polymerization medium and may be a diluent for the solid polymer particles that is separate from and in addition to the unreacted monomers. Suitable diluents included those known in the art and include hydrocarbons which are inert and liquid or are supercritical fluids under slurry polymerization conditions. For example, suitable diluents may include $C_3$-$C_7$ alkanes, such as isobutane, propane, n-pentane, i-pentane, neopentane and n-hexane. In one or more embodiments, the diluent includes isobutane or isopentane. A bulk phase process is similar to that of a slurry process with the exception that the liquid medium is also the reactant (e.g., monomer) in a bulk phase process. However, a process may be a bulk process, a slurry process or a bulk slurry process.

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example. The polyolefins and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

Additional details regarding loop reactor apparatus and polymerization processes may be found, for example, in U.S. Pat. Nos. 4,674,290, 5,183,866, 5,455,314, 5,565,175, 6,045,661, 6,051,631, 6,114,501, 6,262,191, and 8,406,928, all of which are incorporated in their entirety herein.

Additional Disclosure and Aspects

The present disclosure is further illustrated by the following embodiments, which are not to be construed in any way as imposing limitations upon the scope thereof. On the contrary, it is to be clearly understood that resort can be had to various other aspects, embodiments, modifications, and equivalents thereof which, after reading the description herein, can be suggestive to one of ordinary skill in the art without departing from the spirit of the present invention or the scope of the appended claims. Each and every claim is incorporated into the specification as an embodiment of the present invention. Thus, the claims are a further description and are an addition to the detailed description of the present invention.

Aspect 1. A reactor system comprising a reactor pipe having an external surface characterized by an unmodified surface roughness; and, a coolant system, the coolant system comprising a jacket having an internal surface characterized by an unmodified surface roughness, the jacket spaced apart from and surrounding at least a portion of the reactor pipe to form an annulus between the internal surface of the jacket and the external surface of the reactor pipe, a coolant which flows through the annulus to remove heat from the reactor pipe, and at least one spacer having a leading edge and a trailing edge with respect to the coolant flow and characterized by an unmodified surface roughness, the spacer coupling the jacket to the reactor pipe; wherein the external surface of the reactor pipe, the internal surface of the jacket, the at least one spacer, or any combination thereof are independently modified to reduce the fluid resistance of the coolant flow through the annulus.

Aspect 2. The reactor system of Aspect 1, wherein the external surface of the reactor pipe, the internal surface of the jacket, the at least one spacer, or any combination thereof are independently modified by polishing or by coating with a friction-reducing coating to reduce their unmodified surface roughness to a respective modified surface roughness ($R_a$).

Aspect 3. The reactor system of any one of Aspect 1, wherein the external surface of the reactor pipe, the internal surface of the jacket, the at least one spacer, or any combination thereof are independently modified by polishing to reduce their unmodified surface roughness to a respective modified surface roughness ($R_a$).

Aspect 4. The reactor system of any one of the preceding Aspects, wherein modified surface roughness ($R_a$) of the external surface of the reactor pipe, the internal surface of the jacket, the at least one spacer, or any combination thereof is 0.00010 microns or less, 0.00008 microns or less, or 0.00006 microns or less.

Aspect 5. The reactor system of any one of the preceding Aspects, wherein modified surface roughness ($R_a$) of the external surface of the reactor pipe, the internal surface of the jacket, the at least one spacer, or any combination thereof is at least 50% less than, at least 60% less than, or at least 70% less than the respective unmodified surface roughness.

Aspect 6. The reactor system of any one of the preceding Aspects, wherein the coolant system provides a total coolant pressure drop through the coolant system that is 20% lower, 18% lower, 15% lower, or 12% lower than a corresponding total coolant pressure drop through an identical coolant system having the unmodified surface roughness.

Aspect 7. The reactor system of any one of the preceding Aspects, wherein the at least one spacer is polished and has a drag coefficient of less than 1.5, less than 1.2, or less than 1.0.

Aspect 8. The reactor system of any one of the preceding Aspects, wherein the coolant system comprises a plurality of spacers, each having an axis extending from the jacket to the reactor pipe, a portion of which are disposed parallel to and approximately equidistant from each other through the annulus.

Aspect 9. The reactor system of any one of the preceding Aspects, wherein the coolant system comprises a plurality of spacers, for example, from 4 to 24 spacers.

Aspect 10. The reactor system of any one of the preceding Aspects, wherein the at least one spacer comprises a material selected from ceramic, stainless steel, or a combination thereof.

Aspect 11. The reactor system of any one of Aspects 1-10, wherein the at least one spacer is modified by shaping the spacer in cross section to provide a curved or partially curved leading edge.

Aspect 12. The reactor system of any one of Aspects 1-10, wherein the at least one spacer is modified by shaping the spacer in cross section to provide a curved or partially curved leading edge, and a tapered or partially tapered trailing edge.

Aspect 13. The reactor system of any one of Aspects 11-12, wherein the at least one spacer has a fineness ratio of at least about 2, at least about 2.5, at least about 3.0 or at least about 3.5.

Aspect 14. The reactor system of any one of Aspects 11-13, wherein the surface area of the curved or partially curved leading edge is greater than or equal to the surface area of the tapered or partially tapered trailing edge.

Aspect 15. The reactor system of any one of Aspects 11-14, wherein the surface area of the curved or partially curved leading edge is less than the surface area of the tapered or partially tapered trailing edge.

Aspect 16. The reactor system of any one of Aspects 11-15, wherein the at least one spacer has a pitch of from 1 degree to 30 degrees, from 3 degrees to 25 degrees, or from 5 degrees to 20 degrees.

Aspect 17. The reactor system of any one of Aspects 11-16, wherein the leading edge of the at least one spacer comprises a radius of less than about 5.0 inches, less than about 4.5 inches, or less than about 4.0.

Aspect 18. The reactor system of any one of Aspects 11-17, wherein the leading edge is shaped to reduce at least one radius by at least 30%, at least 37% or by at least 45% from a 90° angle.

Aspect 19. The reactor system of any one of Aspects 11-18, wherein the coolant system comprises a plurality of spacers configured to provide a venturi effect when the coolant flows over the plurality of spacers.

Aspect 20. The reactor system of any one of Aspects 11-19, wherein the pressure drop across any single spacer is less than about 12%, less than about 10%, or less than about 8% of a total coolant pressure drop through the reactor system.

Aspect 21. The reactor system of any one of Aspects 11-20, wherein at least a portion of the plurality of spacers is modified and/or shaped to having a drag coefficient of each modified and/or shaped spacer of less than 1.28, less than 1.22, or less than 1.18.

Aspect 22. The reactor system of any one of Aspects 1-21, wherein at least one of the external surface of the reactor pipe and/or the internal surface of the jacket are independently further modified by the addition of one or more protrusions which extend from the internal surface of the jacket and/or the external surface of the reactor pipe into a portion of the annular space to create a venturi effect from the coolant flow.

Aspect 23. The reactor system of Aspect 22, wherein the at least one protrusion is shaped to provide a curved or partially curved leading edge.

Aspect 24. The reactor system of Aspect 22, wherein the at least one protrusion is shaped to provide a curved or partially curved leading edge, and a tapered or partially tapered trailing edge.

Aspect 25. The reactor system of any one of Aspects 22-24, wherein the one or more protrusions comprise one or more continuous protrusions extending from the internal surface of the jacket and/or the external surface of the reactor pipe in a circular fashion.

Aspect 26. The reactor system of Aspect 25, comprising a continuous protrusion extending from the internal surface of the jacket and a corresponding continuous protrusion extending from the external surface of the reactor pipe which are spaced at substantially the same height along the jacket and reactor pipe, respectively, to provide a venturi effect when the coolant flows between the protrusions.

Aspect 27. The reactor system of any one of Aspects 22-26, wherein the one or more protrusions comprise one or more discontinuous protrusions extending from the internal surface of the jacket and/or the external surface of the reactor pipe in a non-circular and segmented fashion.

Aspect 28. The reactor system of Aspect 27, comprising a discontinuous protrusion extending from the internal surface of the jacket and a corresponding discontinuous protrusion extending from the external surface of the reactor pipe which are spaced at substantially the same height along the jacket and reactor pipe, respectively, to provide a venturi effect when the coolant flows between the protrusions.

Aspect 29. The reactor system of Aspect 28, wherein the discontinuous protrusions comprise a paired set on opposite sides of the annulus.

Aspect 30. The reactor system of Aspect 28, wherein the discontinuous protrusions comprise 2, 3, 4, 5, or 6 paired set on opposite sides of the annulus.

Aspect 31. The reactor system of any one of preceding Aspects, wherein the reactor system is a loop reactor comprising a series of reactor pipe sections which form a series of legs and which form a loop.

Aspect 32. The reactor system of Aspect 31, wherein the reactor system has a production capacity of at least about 125,000 lbs/hr and/or a reactor capacity of at least about 35,000 gallons, and a total coolant pressure drop through the coolant system of less than 15 psi, less than 11 psi, or less than 9 psi.

Aspect 33. The reactor system of Aspect 31, wherein the reactor system has a production capacity of at least about 125,000 lbs/hr and/or a reactor capacity of at least about 35,000 gallons, and a coolant pressure drop per leg of the loop reactor of less than 1.4 psi, less than 1.2 psi, or less than 1.0 psi.

Aspect 34. The reactor system of Aspect 31, wherein the reactor system has a reactor capacity of at least about 125,000 lbs/hr and a total coolant pressure drop through the reactor system is less than 15 psi; and wherein at least a portion of the internal surface of the jacket is polished and the surface roughness ($R_a$) is reduced by at least 50% compared to an untreated surface roughness.

Aspect 35. A method of polymerizing olefins, the method comprising contacting at least one olefin monomer with catalyst within the reactor system of any one of the preceding Aspects under polymerization conditions sufficient to form a polyolefin.

Aspect 36. A reactor system comprising:
a loop reactor comprising a reactor pipe having an external surface and a volume of greater than about 35,000 gallons and comprising a series of reactor pipe sections which form a series of legs and which form a loop; and
a coolant system comprising
a jacket having an internal surface, spaced apart from and surrounding at least a portion of the reactor pipe to form an annulus between the internal surface of the jacket and the external surface of the reactor pipe,
a coolant which flows through the annulus to remove heat from the reactor pipe, and
a plurality of spacers, each having a leading edge and a trailing edge with respect to the coolant flow and characterized by an unmodified surface roughness, each spacer coupling the jacket to the reactor pipe;
wherein the plurality of spacers are modified by shaping each spacer in cross section to provide a curved or partially curved leading edge, and a tapered or partially tapered trailing edge, and the total coolant pressure drop through the coolant system is less than 15 psi.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A reactor system comprising:
    a reactor pipe having an external surface characterized by an unmodified surface roughness; and
    a coolant system, the coolant system comprising:
        a jacket having an internal surface characterized by an unmodified surface roughness, the jacket spaced apart from and surrounding at least a portion of the reactor pipe to form an annulus between the internal surface of the jacket and the external surface of the reactor pipe,
        a coolant which flows through the annulus to remove heat from the reactor pipe, and
        at least one spacer having a leading edge and a trailing edge with respect to the coolant flow and characterized by an unmodified surface roughness, the spacer coupling the jacket to the reactor pipe;
    wherein the external surface of the reactor pipe, the internal surface of the jacket, the at least one spacer, or any combination thereof are independently modified to reduce the fluid resistance of the coolant flow through the annulus, and
    wherein the external surface of the reactor pipe, the internal surface of the jacket, the at least one spacer, or any combination thereof are independently modified by polishing or by coating with a friction-reducing coating to reduce their unmodified surface roughness to a respective modified surface roughness ($R_a$).

2. The reactor system of claim 1, wherein:
    the modified surface roughness ($R_a$) of the external surface of the reactor pipe, the internal surface of the jacket, the at least one spacer, or any combination thereof is 0.00010 microns or less, or
    the modified surface roughness ($R_a$) of the external surface of the reactor pipe, the internal surface of the jacket, the at least one spacer, or any combination thereof is at least 50% less than the respective unmodified surface roughness.

3. The reactor system of claim 1, wherein the coolant system provides a total coolant pressure drop through the coolant system that is 20% lower than a corresponding total coolant pressure drop through an identical coolant system having the unmodified surface roughness.

4. The reactor system of claim 1, wherein the at least one spacer is polished and has a drag coefficient of less than 1.5.

5. The reactor system of claim 1, wherein the at least one spacer is modified by shaping the spacer in cross section to provide a curved or partially curved leading edge, a tapered or partially tapered trailing edge, or a combination thereof.

6. The reactor system of claim 5, wherein the at least one spacer has a fineness ratio of at least about 2.

7. The reactor system of claim 5, wherein the at least one spacer has a pitch of from 1 degree to 30 degrees.

8. The reactor system of claim 5, wherein:
    the leading edge of the at least one spacer comprises a radius of less than about 5.0 inches, and/or
    the leading edge is shaped to reduce at least one radius by at least 30% from a 90° angle.

9. The reactor system of claim 5, wherein the coolant system comprises a plurality of spacers configured to provide a venturi effect when the coolant flows over the plurality of spacers.

10. The reactor system of claim 5, wherein the pressure drop across any single spacer is less than about 12% of a total coolant pressure drop through the reactor system.

11. The reactor system of claim 5, wherein at least a portion of the plurality of spacers is modified and/or shaped to having a drag coefficient of each modified and/or shaped spacer of less than 1.28.

12. The reactor system of claim 1, wherein at least one of the external surface of the reactor pipe and/or the internal surface of the jacket are independently further modified by the addition of one or more protrusions which extend from the internal surface of the jacket and/or the external surface of the reactor pipe into a portion of the annular space to create a venturi effect from the coolant flow.

13. The reactor system of claim 12, wherein the at least one protrusion is shaped to provide a curved or partially curved leading edge, a tapered or partially tapered trailing edge, or both.

14. The reactor system of claim 12, wherein the one or more protrusions comprise one or more continuous protrusions extending from the internal surface of the jacket and/or the external surface of the reactor pipe in a circular fashion.

15. The reactor system of claim 12, wherein the one or more protrusions comprise one or more discontinuous protrusions extending from the internal surface of the jacket and/or the external surface of the reactor pipe in a non-circular and segmented fashion.

16. The reactor system of claim 15, comprising a discontinuous protrusion extending from the internal surface of the jacket and a corresponding discontinuous protrusion extending from the external surface of the reactor pipe which are spaced at substantially the same height along the jacket and reactor pipe, respectively, to provide a venturi effect when the coolant flows between the protrusions.

17. The reactor system of claim 1, wherein the reactor system is a loop reactor comprising a series of reactor pipe sections which form a series of legs and which form a loop.

18. The reactor system of claim 17, wherein the reactor system has:
    a production capacity of at least about 125,000 lbs/hr and/or a reactor capacity of at least about 35,000 gallons, and
    a total coolant pressure drop through the coolant system of less than 15 psi and/or a coolant pressure drop per leg of the loop reactor of less than 1.4 psi.

19. The reactor system of claim 1, wherein the reactor system has a reactor capacity of at least about 125,000 lbs/hr and a total coolant pressure drop through the reactor system is less than 15 psi, and
    wherein at least a portion of the internal surface of the jacket is polished and the surface roughness ($R_a$) is reduced by at least 50% compared to an untreated surface roughness.

20. A method of polymerizing olefins, the method comprising contacting at least one olefin monomer with catalyst within the reactor system of claim 1 under polymerization conditions sufficient to form a polyolefin.

21. A reactor system comprising:
a loop reactor comprising a reactor pipe having an external surface and a volume of greater than about 35,000 gallons and comprising a series of reactor pipe sections which form a series of legs and which form a loop; and
a coolant system comprising:
  a jacket having an internal surface, spaced apart from and surrounding at least a portion of the reactor pipe to form an annulus between the internal surface of the jacket and the external surface of the reactor pipe,
  a coolant which flows through the annulus to remove heat from the reactor pipe, and
  a plurality of spacers, each having a leading edge and a trailing edge with respect to the coolant flow and characterized by an unmodified surface roughness, each spacer coupling the jacket to the reactor pipe;
wherein the plurality of spacers are modified by shaping each spacer in cross section to provide a curved or partially curved leading edge, and a tapered or partially tapered trailing edge, and the total coolant pressure drop through the coolant system is less than 15 psi.

22. A reactor system comprising:
a reactor pipe having an external surface characterized by an unmodified surface roughness; and
a coolant system, the coolant system comprising:
  a jacket having an internal surface characterized by an unmodified surface roughness, the jacket spaced apart from and surrounding at least a portion of the reactor pipe to form an annulus between the internal surface of the jacket and the external surface of the reactor pipe,
  a coolant which flows through the annulus to remove heat from the reactor pipe, and
  at least one spacer having a leading edge and a trailing edge with respect to the coolant flow and characterized by an unmodified surface roughness, the spacer coupling the jacket to the reactor pipe;
wherein the external surface of the reactor pipe, the internal surface of the jacket, the at least one spacer, or any combination thereof are independently modified to reduce the fluid resistance of the coolant flow through the annulus, and
wherein at least one of the external surface of the reactor pipe and/or the internal surface of the jacket are independently further modified by the addition of one or more protrusions which extend from the internal surface of the jacket and/or the external surface of the reactor pipe into a portion of the annular space to create a venturi effect from the coolant flow.

23. A reactor system comprising:
a reactor pipe having an external surface characterized by an unmodified surface roughness; and
a coolant system, the coolant system comprising:
  a jacket having an internal surface characterized by an unmodified surface roughness, the jacket spaced apart from and surrounding at least a portion of the reactor pipe to form an annulus between the internal surface of the jacket and the external surface of the reactor pipe,
  a coolant which flows through the annulus to remove heat from the reactor pipe, and
  at least one spacer having a leading edge and a trailing edge with respect to the coolant flow and characterized by an unmodified surface roughness, the spacer coupling the jacket to the reactor pipe;
wherein the external surface of the reactor pipe, the internal surface of the jacket, the at least one spacer, or any combination thereof are independently modified to reduce the fluid resistance of the coolant flow through the annulus,
wherein the at least one spacer is modified by shaping the spacer in cross section to provide a curved or partially curved leading edge, a tapered or partially tapered trailing edge, or a combination thereof, and
wherein the at least one spacer has a fineness ratio of at least about 2.

24. A reactor system comprising:
a reactor pipe having an external surface characterized by an unmodified surface roughness; and
a coolant system, the coolant system comprising:
  a jacket having an internal surface characterized by an unmodified surface roughness, the jacket spaced apart from and surrounding at least a portion of the reactor pipe to form an annulus between the internal surface of the jacket and the external surface of the reactor pipe,
  a coolant which flows through the annulus to remove heat from the reactor pipe, and
  at least one spacer having a leading edge and a trailing edge with respect to the coolant flow and characterized by an unmodified surface roughness, the spacer coupling the jacket to the reactor pipe;
wherein the external surface of the reactor pipe, the internal surface of the jacket, the at least one spacer, or any combination thereof are independently modified to reduce the fluid resistance of the coolant flow through the annulus,
wherein the at least one spacer is modified by shaping the spacer in cross section to provide a curved or partially curved leading edge, a tapered or partially tapered trailing edge, or a combination thereof, and
wherein the leading edge of the at least one spacer comprises a radius of less than about 5.0 inches and/or the leading edge is shaped to reduce at least one radius by at least 30% from a 90° angle.

* * * * *